United States Patent [19]

Licht

[11] Patent Number: 5,571,600

[45] Date of Patent: Nov. 5, 1996

[54] SULFUR/ALUMINUM ELECTROCHEMICAL BATTERIES

[75] Inventor: Stuart Licht, Charlton City, Mass.

[73] Assignee: Clark University, Worcester, Mass.

[21] Appl. No.: 335,299

[22] Filed: Nov. 7, 1994

[51] Int. Cl.$^6$ ..................................................... H01M 6/04
[52] U.S. Cl. .................. 429/188; 429/207; 429/199; 429/206; 429/218; 429/220; 429/223; 429/221; 429/224; 429/225; 429/228; 429/229; 429/231
[58] Field of Search .................................... 429/199, 206, 429/207, 218, 220, 221, 223, 224, 225, 228, 229, 231, 188; H01M 4/24, 10/26, 4/38, 4/50, 4/58

[56] References Cited

U.S. PATENT DOCUMENTS

| | | | |
|---|---|---|---|
| 3,189,486 | 6/1965 | Pryor et al. | 136/100 |
| 3,897,267 | 7/1975 | Tseung et al. | 136/86 |
| 3,953,239 | 4/1976 | Anderson | 136/100 |
| 4,107,406 | 8/1978 | Moden et al. | 429/218 |
| 4,150,204 | 4/1979 | Moden et al. | 429/218 |
| 4,481,266 | 11/1984 | Littauer et al. | 429/12 |
| 4,624,766 | 11/1986 | Boxall et al. | 204/294 |
| 4,626,482 | 12/1986 | Hamlen et al. | 429/27 |
| 4,828,942 | 5/1989 | Licht | 429/50 |
| 4,833,048 | 5/1989 | Dejonghe et al. | 429/104 |
| 4,925,744 | 5/1990 | Niksa et al. | 429/27 |
| 4,950,560 | 8/1991 | Tarcy | 429/27 |
| 5,004,654 | 4/1991 | Hunter et al. | 429/50 |
| 5,260,144 | 11/1993 | O'Callaghan | 429/14 |
| 5,413,881 | 5/1995 | Licht et al. | 429/105 |

FOREIGN PATENT DOCUMENTS 2020478   5/1978   United Kingdom .

OTHER PUBLICATIONS

Licht et al., "Conductometric analysis of the second acid dissociation constant of H$_2$S in highly concentrated aqueous media," J. Electroanal. Chem., 318:111–129, 1991. no month available.

Licht, "An Energetic Medium for Electrochemical Storage Utilizing the High Aqueous Solubility of Potassium Polysulfide," J. Electrochem. Soc., Electrochemical Science & Technology, 134:2137–2141, 1987. no month available.

Licht et al., "Thin Film Cadmium Chalcogenide/Aqueous Polysulfide Photoelectrochemical Solar Cells with *In–Situ* Tin Storage," J. Electrochem. Soc., 134:1064–1070, 1987. no month available.

Licht et al., "The High Aqueous Solubility of K$_2$S and Its Effect on Bulk and Photoelectrochemical Characteristics of Cd(SeTe)/S$_x$-Cells," J. Electrochem. Soc., 133:272–277, 1986. no month available.

Licht et al., "The High Aqueous Solubility of K$_2$S and Its Effect on Bulk and Photoelectrochemical Characteristics of Cd(SeTe)/S$_x$-Cells," J. Electrochem. Soc., 133:277–280, 1986. no month available.

Licht, "Combined Solution Effects Yield Stable Thin–Film Cd(Se,Te)/Polysulfide Photoelectrochemical Solar Cells," J. Phys. Chem., 90:1096–1099, 1986. no month available.

Licht et al., "Numerical Analysis of Aqueous Polysulfide Solutions and Its Application to Cadmium Chalcogenide/Polysulfide Photoelectrochemical Solar Cells," Inorg. Chem., 25:2486–2489, 1986. no month available.

Licht et al., "High efficiency n–Cd(Se,Te)/S$^=$photoelectrochemical cell resulting from solution chemistry control," Appl. Phys. Lett., 46:608–610, 1985. no month available.

Licht et al., "The Effect of Hydroxide Ion on Cd–Chalcogenide/Aqueous Polysulfide Photoelectrochemical Cells," J. Electrochem. Soc., 132:1076–1081, 1985. no month available.

(List continued on next page.)

Primary Examiner—Kathryn Gorgos
Attorney, Agent, or Firm—Fish & Richardson, P.C.

[57] ABSTRACT

A sulfur/aluminum battery in which an aluminum anode and an aqueous alkaline/polysulfide electrolytic solution are in direct contact. At high polysulfide concentrations, parasitic chemical reactions between the aluminum and sulfur are minimized, allowing for efficient oxidation of the aluminum anode, and resulting in a battery having high energy and power densities.

40 Claims, 9 Drawing Sheets

OTHER PUBLICATIONS

Licht, "Combined Solution Effects Yield Stable Increased Efficiency Thin Film Cd(Se,Te) Aqueous Polysulfide Photoelectrochemical Solar Cells," Abstract No. 342, pp. 517–518. no month available.

Licht et al., "A Pronounced Cation Effect on Performance and Stability of Cd–Chalcogenide/Polysulfide Photoelectrochemical Cells," J. Electrochem. Soc., 131:950–951, 1984. no month available.

SULFUR/ALUMINUM ELECTROCHEMICAL BATTERIES

BACKGROUND OF THE INVENTION

This invention relates to electrochemical batteries.

There is a need for cost-effective batteries having high energy densities and moderate-to-high electrical discharge rates. Batteries of this type, such as mechanically rechargeable primary batteries, secondary batteries, and fuel cells, can be used to power devices ranging from flashlights to electrically powered vehicles.

Non-aqueous batteries may have potential as current and voltage sources if challenges relating to environmental compatibility, conductivity, cost, safety, and power density can be overcome. In particular, a variety of metal/molten-sulfur batteries have been developed, with a primary focus on sodium/sulfur cells. The light weight of sulfur makes these systems attractive for electrochemical energy storage. However, those cells may operate at temperatures of between 300° to 350° C. in order to maintain the sodium in a liquid state and to obtain adequate electrolyte conductivity (D. Linden, *Handbook of Batteries*, McGraw-Hill, NY (1984)). Such temperatures can raise material constraints; corrosion, thermal cycling and cell fabrication raise additional challenges.

An alternative low-temperature, water-based battery, described by Licht et al., U.S. Pat. No. 4,828,942, incorporated herein by reference, includes an electrolytic solution containing a high concentration of reducible sulfur; this solution retains high Coulombic efficiencies (i.e., the ability of the anode to generate charge), similar to those of molten-sulfur batteries, yet operates at a moderate temperature and is highly conductive. Unfortunately, while there exists a large energy difference between sulfur and other materials used for second half-cells in the battery, many preferred materials (such as tin) have generally resulted in low battery voltages. (Licht, J. Electrochem. Soc. 134: 2137 (1987)).

In addition, metals such as aluminum and lithium can undergo a rapid chemical reaction in concentrated aqueous alkaline or alkaline polysulfide electrolytes. For example, it is expected that sulfur, when dissolved in solution and in contact with aluminum, will result in a chemical reaction which is highly exothermic and expected to interfere with the electrochemical oxidation of aluminum:

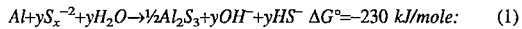

$$Al + yS_x^{-2} + yH_2O \rightarrow \tfrac{1}{2}Al_2S_3 + yOH^- + yHS^-  \quad \Delta G° = -230 \text{ kJ/mole:} \qquad (1)$$

Al can also decompose to $Al(OH)_3$ via an exothermic chemical reaction:

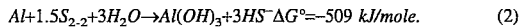

$$Al + 1.5S_{2\text{-}2} + 3H_2O \rightarrow Al(OH)_3 + 3HS^- \quad \Delta G° = -509 \text{ kJ/mole.} \qquad (2)$$

These reactions hinder the performance of the electrochemical cell, resulting in the release of heat rather than electricity. Strategies used to avoid undesired reactions, such as maintaining a large ion flux near the anode, or isolating the ions from the anode, are described in PCT publication no. WO94/16468 (published July, 1994), and U.S. Pat. No. 5,413,881, the latter hereby being incorporated by reference. The electrochemical cells described therein contain two half-cells positioned in electrochemical contact with each other; the half-cells contain, respectively, polysulfide and alkaline solutions.

SUMMARY OF THE INVENTION

Accordingly, the invention provides a sulfur/aluminum battery in which an aluminum anode and a sulfide/polysulfide ion solution are in direct contact; at high concentrations of dissolved sulfur, the conventional substantial chemical reaction between aluminum and sulfur is avoided, and high yields of electrochemical energy can be generated. In particular, the faradaic discharge of the aluminum anode approaches 100% Coulombic efficiency at high polysulfide concentrations, thereby allowing efficient oxidation of the aluminum anode.

In one aspect, therefore, the invention provides an electrical storage cell including an aluminum-containing anode and an aqueous, electrolytic solution in direct contact with the aluminum-containing anode. The solution contains sufficient concentration of sulfide ions, polysulfide ions, or both to permit efficient electrochemical oxidation of the aluminum-containing anode.

"Direct contact" means that aluminum (or aluminum-containing) regions of the anode are positioned with respect to the electrolytic solution such that electrons may be transferred therebetween. For example, aluminum regions of an anode which may be coated with a thin film (e.g., a layer of aluminum oxide) are considered to be in "direct contact" with the solution even if the film physically separates the aluminum regions from the electrolytic solution.

Efficient electrochemical oxidation that a high percentage of the electrons which are theoretically stored in the aluminum are electrochemically retrieved.

In other aspects of the invention, the aluminum-containing anode, and optionally an electro-catalytic electrode, are in direct contact with an aqueous electrolytic solution containing sulfide ions, polysulfide ions, or sulfide and polysulfide ions combined.

The combined concentrations of sulfide ions and polysulfide ions is preferably at least 0.1 molal, and more preferably between 1 and 20 molal. The "molal" concentration of the sulfide species in the electrolytic solution, as used herein, is meant the ratio of solute moles to the weight of liquid. For example, a solution that is 0.1 m in combined sulfide and polysulfide ions includes the sulfide species provided by dissolving 0.1 mole $K_2S$ in 1 kg of water. The weight of all solute, whether or not it is dissolved in the liquid, is included in making this determination.

The aqueous solution may be an alkaline solution, and may contain at least 10 molar [$OH^-$]. Hydroxide ions may also be present in the solution due to the natural hydrolysis of sulfide ions to hydroxide and hydrosulfide ions. Preferably, the aqueous solution further includes a cation selected from the group of $Li^+$, $Na^+$, $K^+$, $Rb^+$, $Cs^+$, $NH_4^+$, $Mg^{2+}$, $Ca^{2+}$, $Ba^{2+}$, and $Al^{3+}$. In other embodiments, the aqueous solution also contains a halide, nitrate, or sulfate anion, and has a conductivity of between 0.001 and 2.0 mho/cm. In still other embodiments, the aqueous solution further comprises an additive salt, such as indium hydroxide, germanium oxide, sodium stannate, gallium oxide and imidazole salts.

In other preferred embodiments, the aqueous solution is maintained in contact with a solid-phase redox agent, such as solid-phase sulfur, solid polysulfide salts, or hydroxide salts. Preferably, solid sulfur is used as the solid-phase redox agent, and is present at equilibrium in an amount of at least 1% by weight of the aqueous solution.

In other embodiments, the aluminum-containing anode contains 99.9% pure aluminum or an aluminum alloy, and may include a pre-treated surface, which may, e.g., contain amalgamated Hg. In still other embodiments, the electrocatalytic electrode includes a porous material, such as porous nickel or porous brass; preferably, the electrocatalytic electrode comprises cobalt sulfide. In other embodiments, the electrocatalytic electrode comprises a metal, a metal chalcogenide, or a metal oxide which is insoluble in the aqueous solution. The metal may be selected from the group including platinum, palladium, nickel, copper, cobalt, manganese, tungsten, steel, molybdenum, iridium, zinc, lead, and alloys thereof. Alternatively, the electrocatalytic electrode is a carbon electrode.

DESCRIPTION OF THE PREFERRED EMBODIMENTS

Figure 1A:
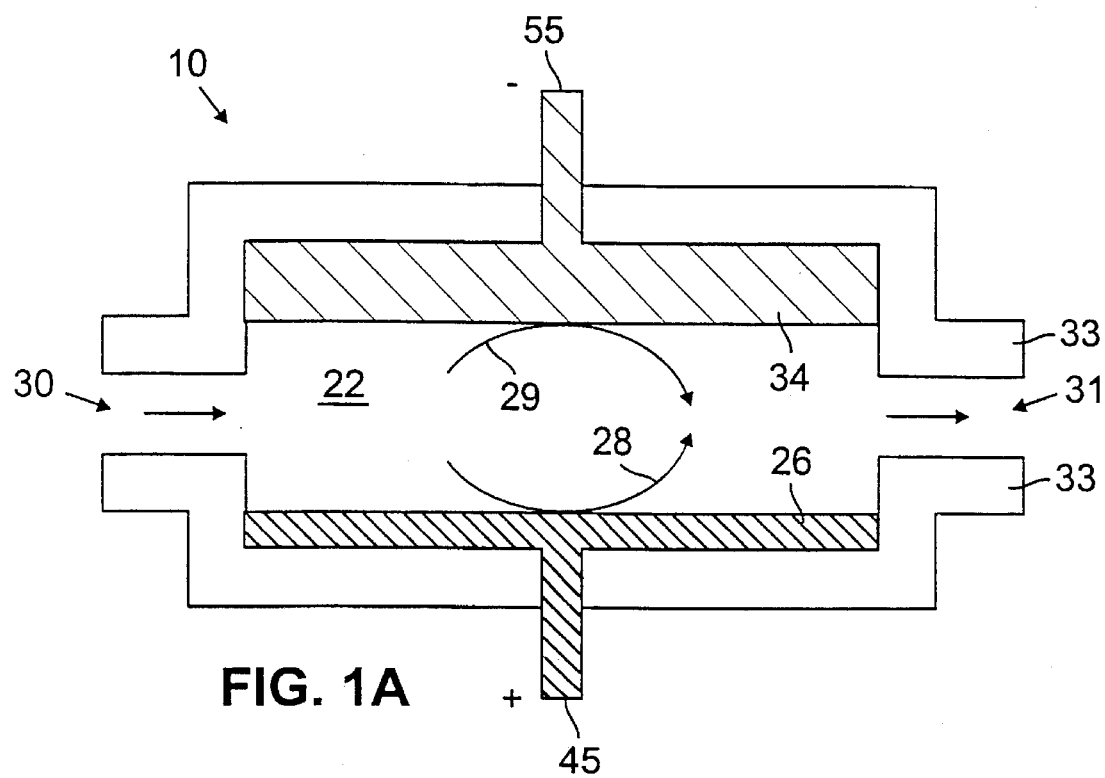
FIGS. 1A and 1B show cross-sectional views of an electrochemical cell according to the invention.
Figure 1B:
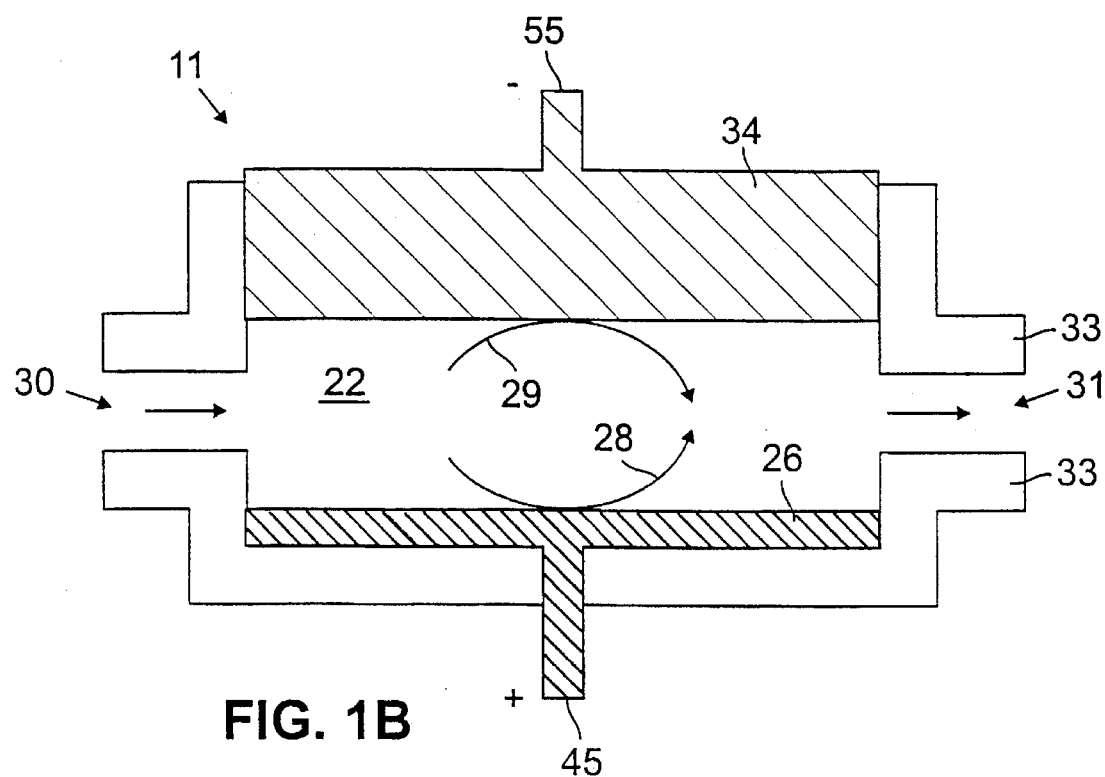

Referring to FIGS. 1A and 1B, an electrochemical cell 10 contains a housing 33 surrounding an aqueous alkaline/polysulfide solution 22 in contact with an electrocatalytic cathode 26 and an aluminum anode 34. Alternatively, as shown in FIG. 1B, the aluminum anode 34 of the cell 11 may be used to form a moveable portion of the housing while being maintained in direct contact with the alkaline/polysulfide solution 22. In this case, the anode 34 can be moved inward during operation to maintain a constant separation between the anode and the cathode as the anode is consumed to produce energy. Alternatively, an aluminum portion functioning as the anode may be attached to a moveable portion. In embodiments, the cathode 26 is preferably composed of cobalt sulfide or copper sulfide, and the alkaline/polysulfide solution 22 contains polysulfide anions in the form of a potassium polysulfide solution (e.g., $K_2S_x$, where x is greater than 1) prepared by the addition of sulfur to $K_2S$, which in turn is prepared by the mass-monitored reaction of KOH with $H_2S$. Alternatively, sulfide anions may be produced by reducing solid sulfur directly in an aqueous electrolytic solution. Two electrical contact points 45, 55 are included, respectively, on the cathode 26 and anode 34 to allow for current flow and voltage generation. During electrical discharge through a resistive load, the electrical contact points 45, 55 are in electrical contact with each other.

During operation, the alkaline/polysulfide solution 22 flows through an entrance port 30 and enters the interior of the cell 10, where it contacts both electrodes 26, 34. Interaction of the solution 22 with the electrocatalytic cathode 26 results in reduction of the polysulfide anions to sulfide ions (i.e., $HS^-$) and shorter-length polysulfide anions, while oxidation of the aluminum anode 34 results in the formation of aluminate. Electron flow for these redox processes are indicated schematically in the figure by the arrows 28 (reduction) and 29 (oxidation). After contacting the electrodes 26, 34, the aqueous solution 22 flows out of the cell interior through an exit port 31, thereby allowing the solution to be continually refreshed.

Figure 2:
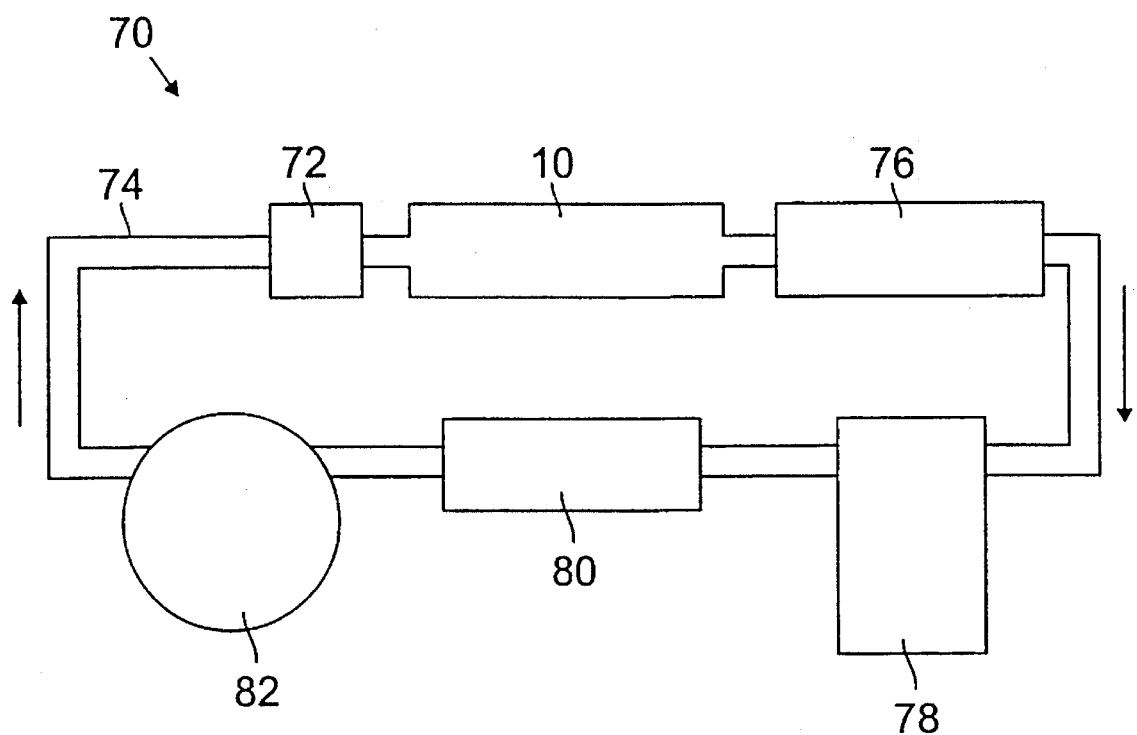
FIG. 2 is a schematic view of a flow loop including the electrochemical cell.

Referring to FIG. 2, a flow-in loop 70, used in accordance with the invention, includes a pump 80 to induce fluid flow, a valve 72 allowing a well-defined amount of the electrolytic solution to flow into the cell 10, and a pipe network 74 to allow the solution to flow through the components of the loop 70. A similar arrangement for flowing electrolytic solutions, for example, is described in Anderson, U.S. Pat. No. 3,953,239, the contents of which are incorporated herein by reference. In addition, after flowing through the valve 72 and into the cell 10, the electrolytic solution interacts with the cell electrodes, and flows through a heat exchanger 76 which allows the solution temperature to be kept roughly constant. A gas/separator vessel 78 allows gas (e.g., hydrogen) from the pipe network 74 to be bled off, and solids generated during the redox process (e.g., aluminate) to be precipitated and removed from the solution. The pump 80 then forces the solution through a polysulfide/hydroxide/sulfur mixing vessel 82 which controls the concentration of the alkaline/polysulfide solution and allows the electrolyte to be replenished prior to re-entering the cell 10.

In all embodiments, an electrochemical potential is generated between the two contact points in the battery as the aluminum anode is oxidized and the polysulfide electrolyte is reduced. The redox equations for the reduction of sulfur and the oxidation of aluminum may be written in one form as:

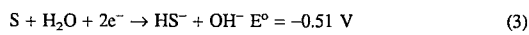

$$S + H_2O + 2e^- \rightarrow HS^- + OH^- \quad E° = -0.51 \text{ V} \qquad (3)$$

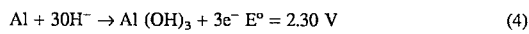

$$Al + 3OH^- \rightarrow Al(OH)_3 + 3e^- \quad E° = 2.30 \text{ V} \qquad (4)$$

where E° is the electrochemical potential of the half-cell reaction. Consequently, the electrical discharge of the sulfur/aluminum battery may be expressed by combining equations (3) and (4):

$$2Al + 3S + 3OH^- + 3H_2O \rightarrow 2Al(OH)_3 + 3HS^- \quad E_{cell} = 1.8 \text{ V}. \qquad (5)$$

The faradaic capacity of the sulfur/aluminum battery is 505 Ah/kg, making the theoretical specific energy:

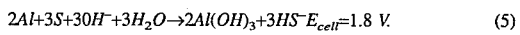

$$1.8 \text{ Volt} \times 505 \text{ Ah/kg} = 910 \text{ Wh/kg}. \qquad (6)$$

At equilibrium, polysulfide concentrations greater than about 1 m (using, e.g., $K_2S_3$ dissolved in an aqueous solution as the source of polysulfide ions) exothermic chemical reactions normally present between aluminum and sulfur are passified. This allows the aluminum anode to be in direct contact with the polysulfide solution, thereby providing an even more efficient oxidation of aluminum than in polysulfide-free electrolytic solutions. This results in a battery which has a high-faradaic capacity, is capable of operating near or at room temperature, and is additionally capable of retaining the substantial Coulombic capacity typically present in molten-sulfur batteries.

In embodiments of the invention, therefore, the reducible sulfide or polysulfide ions are formed by dissolution of polysulfide salts, solid-phase polysulfide salts, and/or solid-phase sulfur in the aqueous solution. Preferably, the aqueous solution has conductivities of between 0.001 and 2.0 mho/cm, and contains an equilibrium polysulfide ion concentration of at least 1 m. Polysulfide salts are of the formula $M_xS_y$, such as $K_2S_4$, where M is a cation of charge $z^+$, and contains reducible sulfur when $2y-zx$ is greater than zero. Preferably, M is H, Li (lithium), Na (sodium), K (potassium), Rb (rubidium), Cs (cesium), $NH_4$ (ammonium), Ba (barium), Sr (strontium), Ca (cadmium), or Al (aluminum). In addition, sulfur may be dissolved into solution in the form of soluble polysulfide compounds, such as phosphorous polysulfide or arsenic polysulfide. Sulfur dissolved in the aqueous solution results in a complex equilibrium of $M^{2y/x}$, $H_2S$, $HS^-$, $S^{2-}$, $S_2^{2-}$, $S_2^-$, $S_3^{2-}$, $S_4^{2-}$, $S_5^{2-}$, $H_2O$, $H^+$ and $OH^-$ ions. Table 2, shown below, lists the predicted concentrations (determined by computer modeling of the polysulfide equilibration process) of several species contained in the aqueous alkaline polysulfide solutions.

TABLE 1

Polysulfide Concentrations at Equilibrium

| Nominal Composition | Concentration (moles per liter) | | | | |
|---|---|---|---|---|---|
| $K_2S$ | 3 | 3 | 1.5 | 3 | 3 |
| Sulfur | 0 | 6 | 3 | 1 | 6 |
| KOH | 3 | 3 | 3 | 3 | 0 |
| $[H_2S]$ | <0.1 | <0.1 | <0.1 | <0.1 | <0.1 |
| $[HS^-]$ | 3.0 | 0.4 | 0.2 | 2.5 | 0.6 |
| $[S^{2-}]$ | <0.1 | <0.1 | <0.1 | <0.1 | <0.1 |
| $[S_2^{2-}]$ | 0 | <0.1 | <0.1 | <0.1 | <0.1 |
| $[S_3^{2-}]$ | 0 | 1.7 | 0.8 | 0.4 | 1.2 |
| $[S_4^{2-}]$ | 0 | 0.9 | 0.5 | 0.03 | 1.2 |
| $[S_5^{2-}]$ | 0 | <0.1 | <0.1 | <0.1 | <0.1 |
| $[OH^-]$ | 6.0 | 3.4 | 3.2 | 5.5 | 0.6 |

The results of Table 1 indicate that following the dissolution of sulfur or a sulfur salt in an aqueous solution, the predominant reduced sulfide species is likely $HS^-$, and the predominant polysulfide species are likely $S_3^{2-}$ and $S_4^{2-}$. Polysulfide catholytic solutions containing these components can have charge capacities of up to 500 Ah/kg, which may be further extended to 1070 Ah/kg by use of a solid-sulfur cathode immersed in a polysulfide solution.

The solid/solution-phase sulfur cathode has the benefits of high storage capacity and cell voltage. During operation, the solid-phase sulfur maintains long-chain polysulfide species in solution, resulting in an increase in cell voltage. In theory, the maximum storage capacity of the cell containing solid sulfur is substantially higher than the previous limit of $2.8 \times 10^6$ C/kg available with solid $K_2S_4$ storage. This limit (assuming all solid sulfur is dissolved to form polysulfide anions, which are then reduced in water) is given by the equation:

$$S + H_2O + 2e^- \rightarrow HS^- + OH^- \tag{7}$$

$$\text{storage} = \frac{1 \text{ mole } (S + H_2O)}{(0.032 + 0.018) \text{kg}} \cdot \frac{2 \text{ faraday}}{\text{mole}} \cdot$$

$$\frac{96500 \text{C}}{\text{faraday}} = 3.9 \times 10^6 \text{ C/kg}$$

In addition to polysulfide anions, the aqueous solution may also include a salt having a halide, nitrate, or sulfate anion, which is complexed to either a $Li^+$, $Na^+$, $K^+$, $Rb^+$, $Cs^+$, $NH^+$, $Mg^{2+}$, $Ca^{2+}$, $Ba^{2+}$ or $Al^{3+}$ cation. Other solution-phase additives may include imidazole or dissolved salts, such as indium hydroxide, germanium oxide, sodium stannate, and gallium oxide. These additives can modify or stabilize the aluminum discharge, and can enhance cell potential, decrease the polarization losses (i.e., the detrimental voltage losses which occur when current is discharged from the cell), and diminish the rate of secondary parasitic side reactions producing hydrogen.

The electrocatalytic electrode functions as a current-transferring electrode, and is preferably composed of a porous material, such as cobalt sulfide deposited on porous nickel or brass. Alternative electrocatalytic electrodes contain metals, metal chalcogenides, or metal oxides, which are insoluble in sulfide or polysulfide solutions; in this embodiment, preferred metals are platinum, palladium, nickel, copper, cobalt, manganese, tungsten, steel, molybdenum, iridium, zinc, lead, and alloys, oxides and chalcogenides thereof. Non-metal electrocatalytic electrodes, composed of materials such as carbon, may also be used. The electrocatalytic electrode can be produced, for example, by electrodeposition of Co at 50 mA/cm² from a 50° C. solution containing 2 m $CoSO_4$, 0.6 m boric acid, and 0.2 m NaCl onto a thin (0.001 inch) screen of perforated brass or reticulated porous nickel, followed by alternating anodic and cathodic treatments in a polysulfide solution.

The aluminum electrode of the battery constitutes both the consumed anode material and the current-transferring electrode, and is preferably composed of an aluminum-containing material, such as pure aluminum (available from Alcan International of New York) having a purity of at least 99.9%. Alternatively, an aluminum-containing alloy, such as aluminum-magnesium, aluminum-tin, aluminum-gallium, aluminum-indium, aluminum-indium-tin, aluminum-magnesium-tin, aluminum-magnesium-tin-gallium, or a similar material may be used as the anode. A suitable aluminum-containing alloy, for example, is DF50V, which contains less than 1% magnesium, tin, and gallium. Typically, the aluminum anode has an area of 0.5–5.0 cm², depending on the application of the battery. In order to increase its Coulombic efficiency, the anode surface may be pre-treated with a mercury amalgam.

Figure 3:
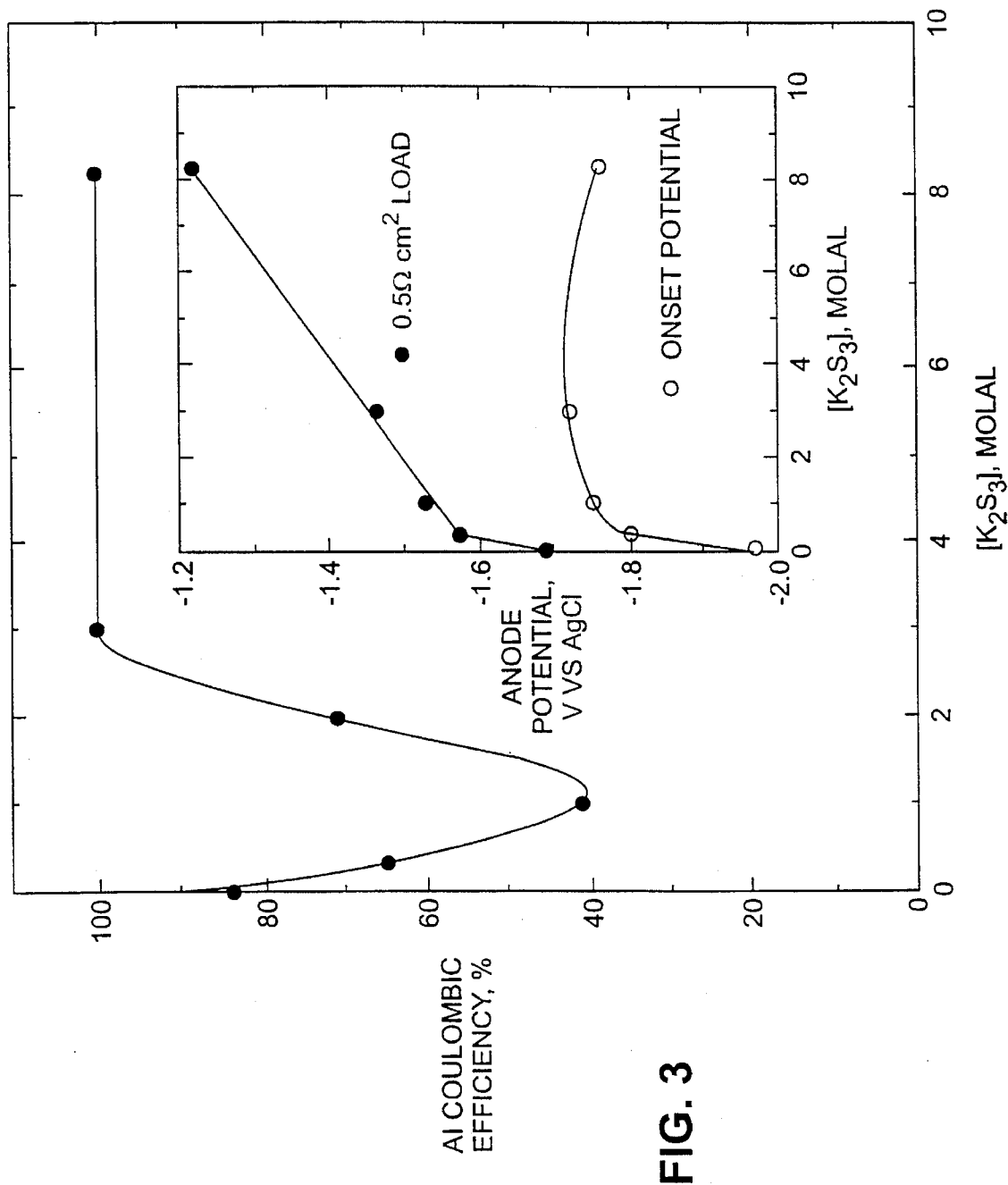
FIGS. 3 and 4 show, respectively, plots of the anode Coulombic efficiency as a function of polysulfide and sulfur concentrations.
Figure 4:
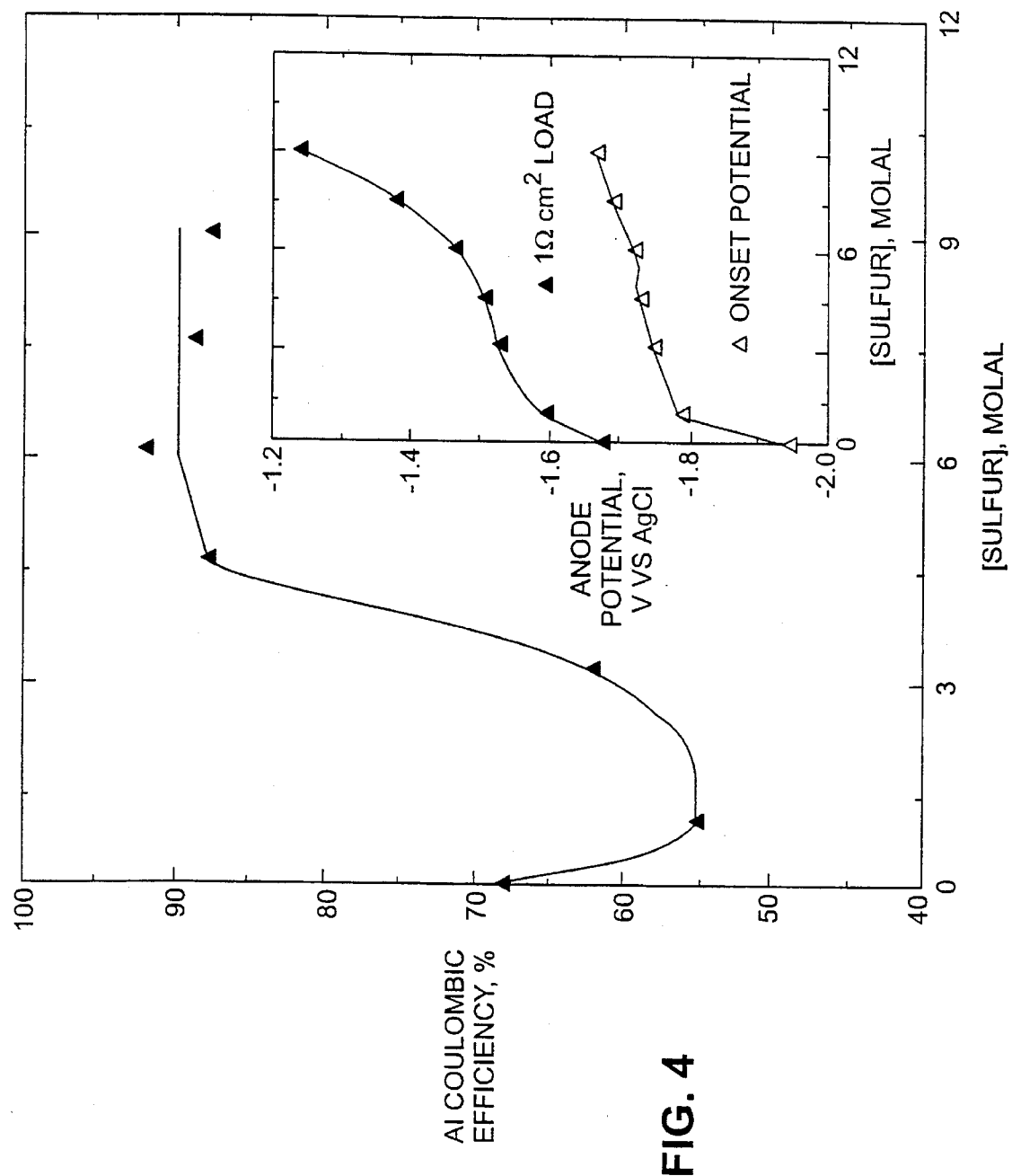

As is conventionally expected, at low concentrations, added sulfur reacts with aluminum to diminish the storage capacity of the cell. Referring now to FIGS. 3 and 4, in a battery according to the invention, low concentrations (i.e., less than about 1.5 molal) of a $K_2S_3$ electrolyte solution at 75° C. result in a sharp decrease in Coulombic efficiency at the aluminum anode. In this case, the decrease in electrochemical conversion is attributed mainly to parasitic chemical reactions between aluminum and the polysulfide ions. This results in the production of heat, rather than electricity, thereby providing a non-electrochemical pathway for aluminum consumption. Similarly, as shown in FIG. 4, the Coulombic efficiency of the aluminum anode decreases for low concentrations of zero-valent sulfur (i.e., less than about 1 molal) dissolved in a 1 molal potassium sulfide electrolytic solution at 75° C. As before, this decrease is attributed to parasitic exothermic chemical reactions between the aluminum and sulfur.

Unexpectedly, higher concentrations of added sulfur appear to impede reactions between aluminum and sulfur, resulting in an increase in the storage capacity of the cell. As the $K_2S_3$ concentration is increased from about 2 to 3 molal, the Coulombic efficiency of the aluminum anode increases to nearly 100%, indicating that consumption of the anode is almost entirely due to electrochemical mechanisms; higher concentrations of $K_2S_3$ have no additional effect on the Coulombic efficiency. A similar effect is shown in FIG. 4; in this case, as the sulfur concentration is increased from about 2.5 to 4.5 molal, the Coulombic efficiency of the aluminum anode increases to a level of about 90%, where it remains unchanged for higher sulfur concentrations.

The inset of FIG. 3 shows the variation of the anode potential with $K_2S_3$ concentration measured across a 0.5 Ω load at oxidative current densities approaching 1 A/cm². Increases in polarization losses at the aluminum/polysulfide interface at the higher polysulfide concentration results in increased passivation of the electrode surface; this, in turn, results in lower chemical reactivity and protection of the aluminum, and a reduction in the rate of parasitic chemical reactions. Similarly, the inset of FIG. 4 shows that enhanced aluminum stability is correlated with an increase in polarization at the aluminum/polysulfide interface; as before, the presence of high concentrations of zero-valent sulfur tends to passivate and protect the aluminum surface.

At high concentrations, therefore, the direct electrochemical oxidation of aluminum in aqueous alkaline polysulfide solution increases both the energy density and the discharge-current density of the sulfur/aluminum battery. Batteries of this type containing polysulfide concentrations described herein are capable of operating in the high-current-density domain, resulting in discharge rates of 100 mA/cm$^2$ and higher.

Figure 5:
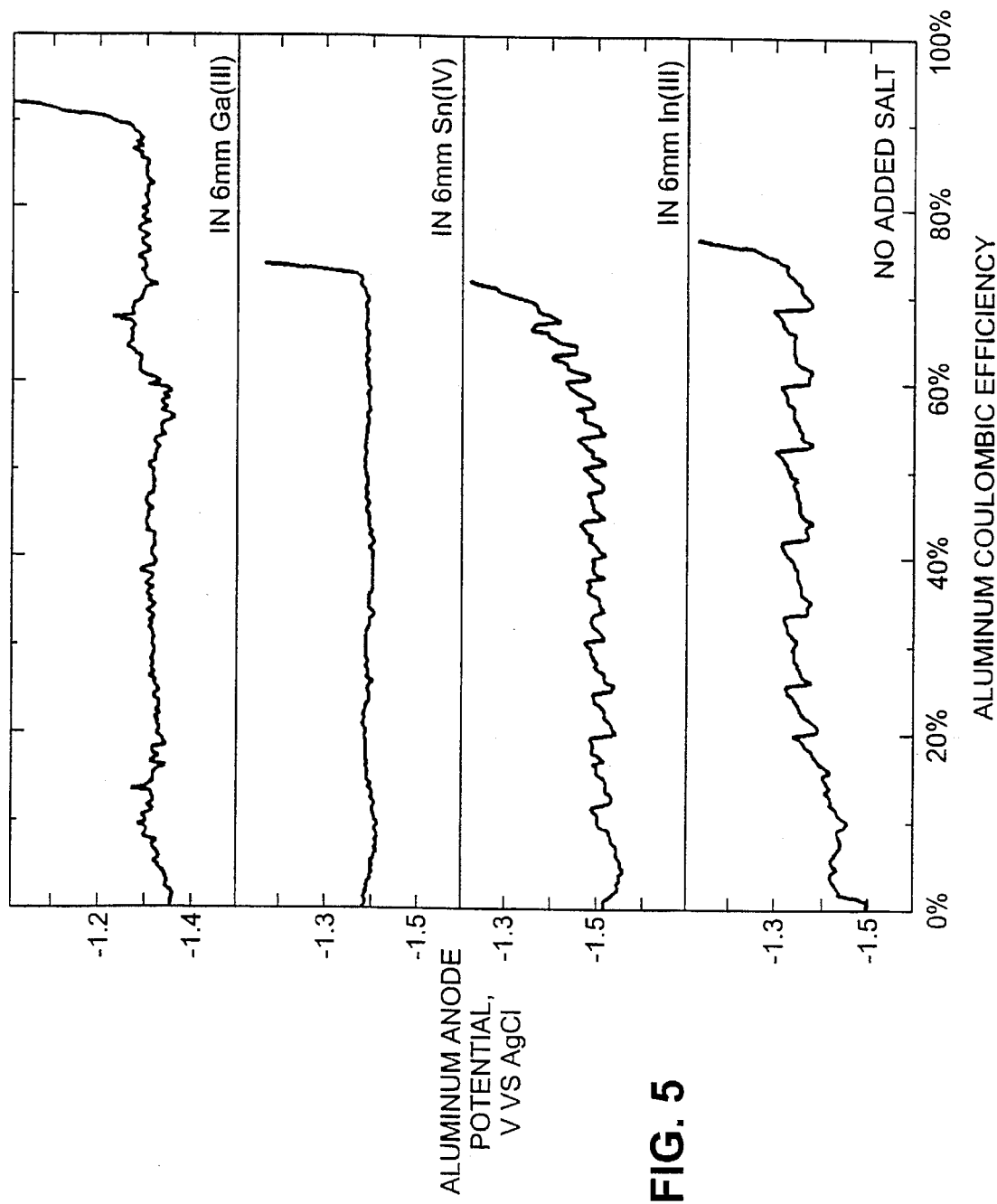
FIGS. 5 and 7 show, respectively, plots of the anode potential as a function of Coulombic efficiency and current density.

Solution-phase additives can be added to the electrolytic solutions of the cell to modify or stabilize the aluminum discharge. Referring now to the top trace of FIG. 5, the potential (vs. an AgCl electrode) of a 99.999% pure anode contained in a battery of the invention is affected by small concentrations of Ga(III) added to an alkaline polysulfide electrolytic solution at 75° C. Addition of this compound activates the aluminum anode, resulting in a potential difference of about −1.35 V when the Coulombic efficiency is less than 80%. The presence of dissolved gallium also acts to further stabilize the aluminum, as evidenced by the smoother trace (in comparison to the bottom trace of the figure) and to increase the Coulombic efficiency of the anode. Small concentrations of other solution-phase additives (i.e., Sn(IV) and In(III)) also effect the discharge characteristics of the aluminum anode. For example, addition of solution-phase indium increases (i.e., anodically shifts) the aluminum potential, and evidently increases the chemical reactivity of the metal as evidenced by a decrease in Coulombic efficiency. Added stannate results in a more uniform anodic discharge, as evidenced by the smooth oxidation potential relative to the discharge in other electrolytes shown in the figure.

Alternatively, aluminum may be activated by incorporation of magnesium, tin, indium, gallium or other metals directly (i.e., alloying) into the anode. The effect of the aluminum anode composition on the Coulombic efficiency is listed for several sulfur/aluminum cells in Table 2, below. In all cases, electrolyte solutions are at temperatures of between 75°–90° C., and contain 3 m KOH, 3 m K$_2$S$_3$, and the indicated metal-oxide salt; anodes contain 99.999% aluminum, or an alloy (AB50V) containing over 99% aluminum and alloyed with less than 1% Mg, Sn, and Ga. To make the measurements, cells were discharged over a 2 Ω precision load.

TABLE 2

| Coulombic Efficiency vs. Anode Composition | | | | |
|---|---|---|---|---|
| Anode Composition | Added Aqueous Salt | [Salt] | T (°C.) | Anode Coulombic Efficiency |
| 99.999% Al | none | 0 | 75 | 75% |
| 99.999% Al | Na$_2$SnO$_3$ | 6 mm | 75 | 72% |
| 99.999% Al | In(OH)$_3$ | 6 mm | 75 | 70% |
| 99.999% Al | Ga$_2$O$_3$ | 6 mm | 75 | 91% |
| AB50V Al | none | 0 | 75 | 81% |
| AB50V Al | Na$_2$SnO$_3$ | 6 mm | 75 | 92% |
| AB50V Al | In(OH)$_3$ | 6 mm | 75 | 84% |
| AB50V Al | Ga$_2$O$_3$ | 6 mm | 75 | 78% |

TABLE 2-continued

| Coulombic Efficiency vs. Anode Composition | | | | |
|---|---|---|---|---|
| Anode Composition | Added Aqueous Salt | [Salt] | T (°C.) | Anode Coulombic Efficiency |
| AB50V Al | Na$_2$SnO$_3$ | 60 mm | 75 | 76% |
| AB50V Al | Na$_2$SnO$_3$ | 6 mm | 95 | 50% |
| AB50V Al | Ga$_2$O$_3$ | 6 mm | 95 | 2% |

As seen from Table 2, an aluminum alloy containing less than 1% Sn and Ga generally provides higher anode Coulombic efficiencies at 75° C. As show in FIG. 5, these small amounts of solution phase additives substantially effect the discharge voltage of the cell, as expressed by the aluminum anode potential.

Figure 6:
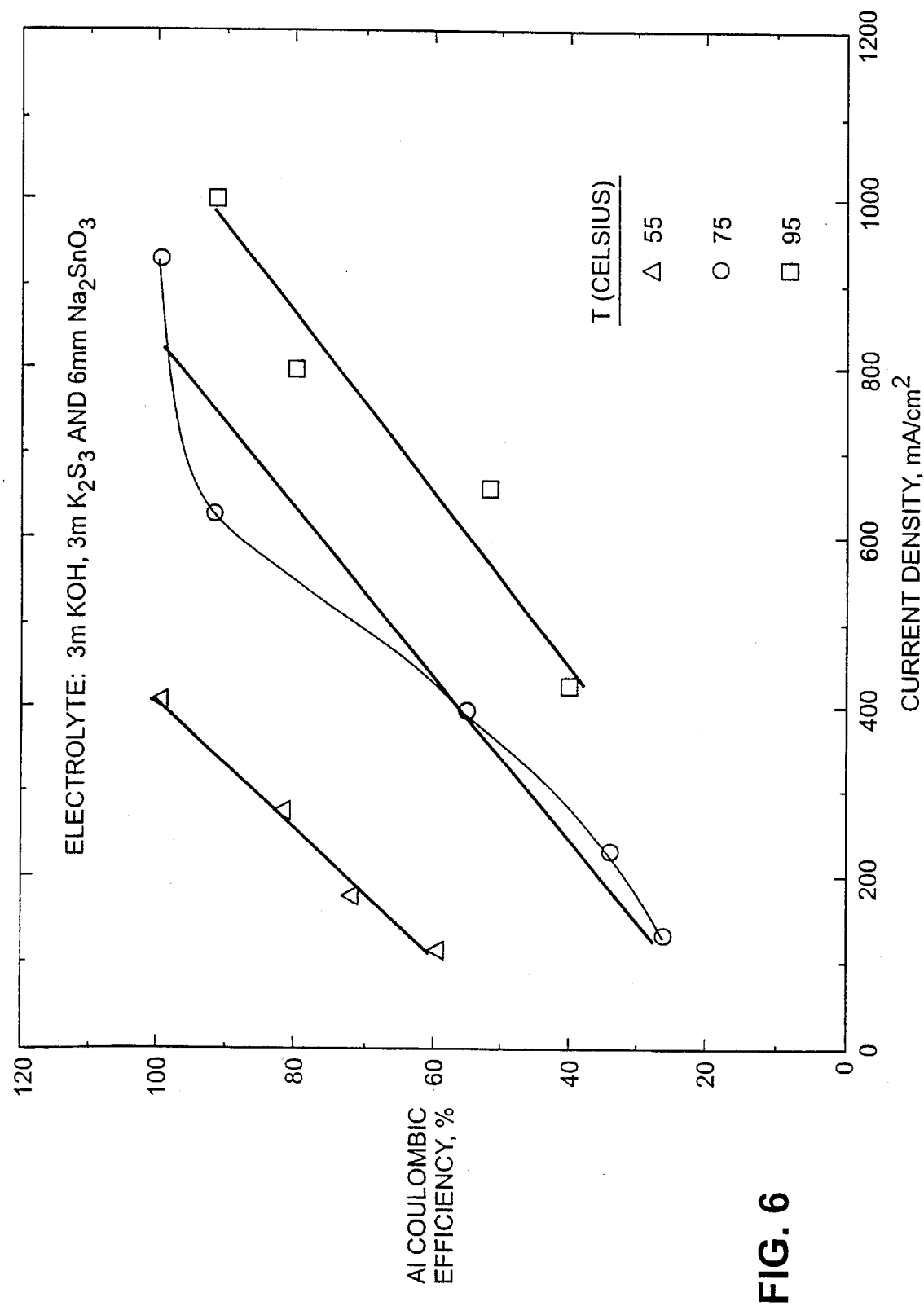
FIGS. 6 and 8 show, respectively, plots of the anode Coulombic efficiency as a function of current density and KOH concentration.

Referring now to FIG. 6, the Coulombic efficiency of the anode, when placed in 3 m K$_2$S$_3$ polysulfide solutions, increases with current density. At high discharge current densities (i.e., greater than 100 mA/cm$^2$), the rate of the electrochemical reaction is increasingly faster than the competing chemical reactions, resulting in an increase in Coulombic efficiency at the anode. In the 75° C. polysulfide solution, as the current density increases from 120 to 920 mA/cm$^2$, the aluminum Coulombic efficiency improves from 25% to 100%. This trend is repeated at both higher (95° C.) and lower (55° C.) temperatures.

Figure 7:
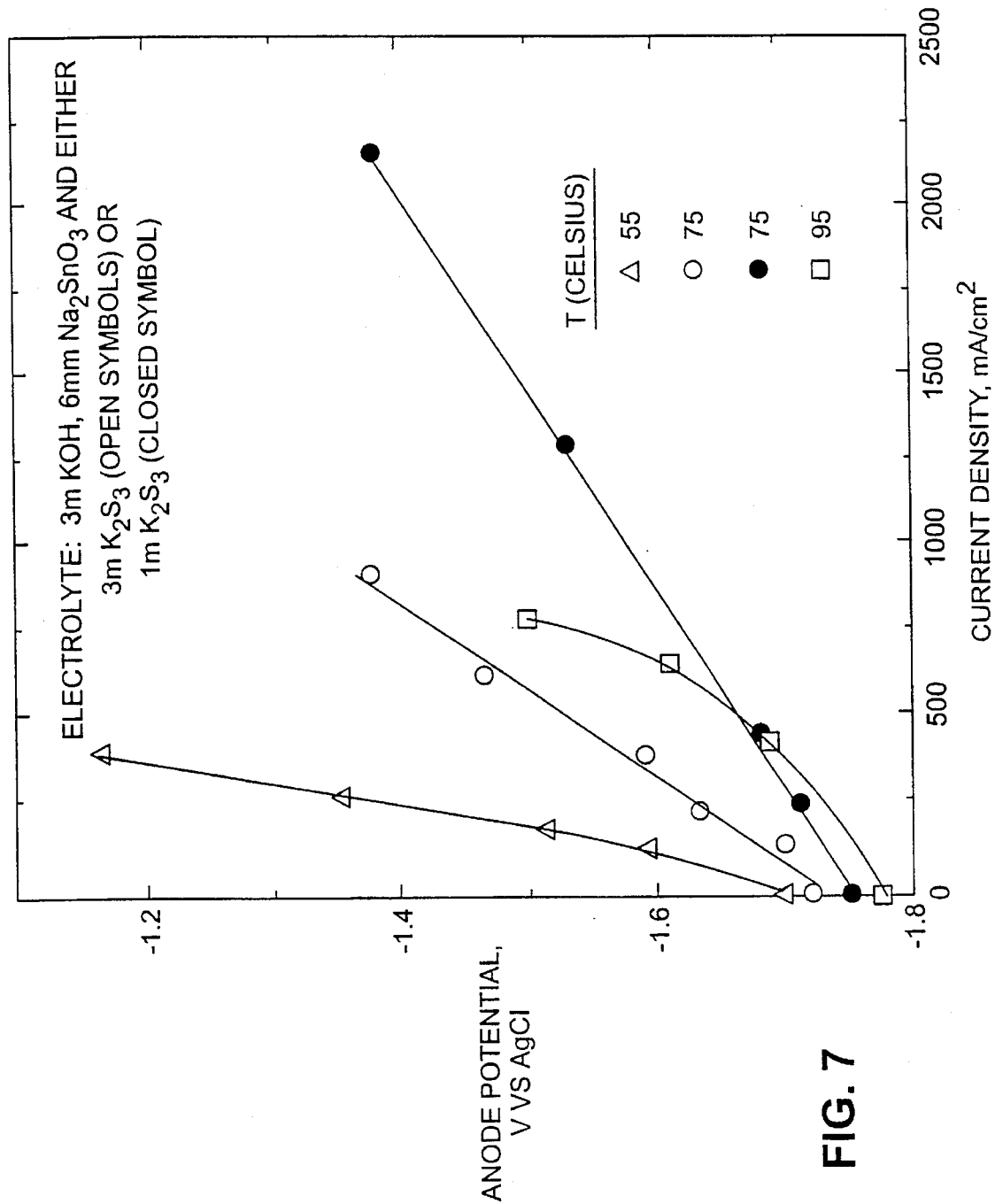

Referring now to FIG. 7, the anode potential increases in a linear fashion with current density, with the slope of the increase being a function of temperature. In particular, at low temperatures (i.e., 55° C.), the anode potential in a 3 m KOH/3 m K$_2$S$_3$ electrolytic solution increases from −1.70 to −1.17 V as the current density rises from 0 to about 400 mA/cm$^2$. Polarization losses in the 1 m and 3 m K$_2$S$_3$ electrolytes (0.2 mV cm$^2$ mA$^{-1}$, compared to 0.4 mV cm$^2$ mA$^{-1}$ at 75° C.) are consistent with the values plotted in the inset of FIG. 3. In these plots, the anode is shown to exhibit lower polarization losses when immersed in lower concentrations of dissolved sulfur.

Figure 8:
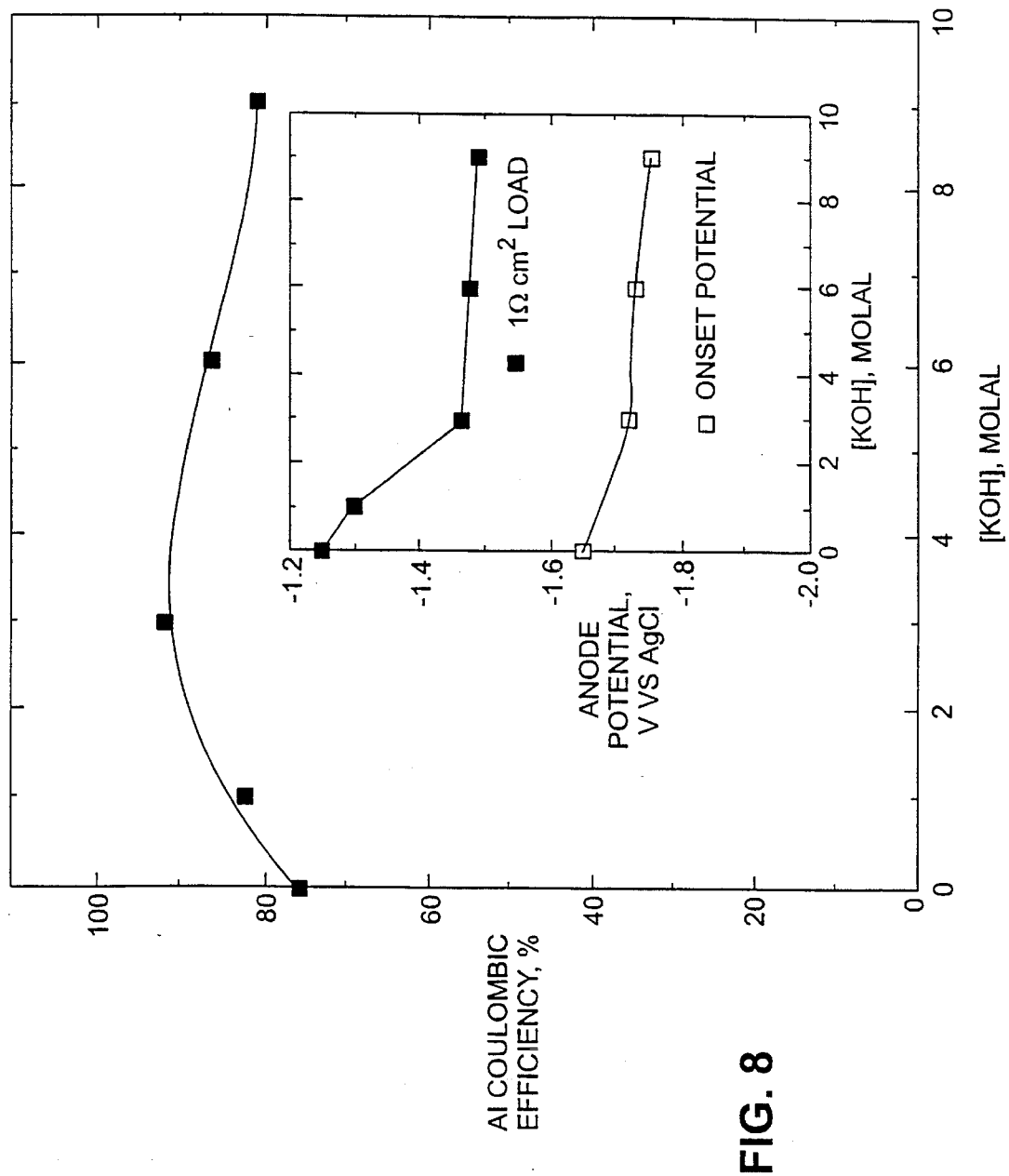

Referring now to FIG. 8, when immersed in an aqueous polysulfide electrolytic solution at 75° C., the Coulombic efficiency of the aluminum anode is weakly dependent on KOH concentrations up to 9 m. Low concentrations of KOH, however, can negatively impact the forward rate of aluminum electrochemical oxidation; this is reflected in the lower anodic efficiencies and higher polarization losses in polysulfide electrolytes containing less than 3 m KOH. At concentrations of KOH greater than 3 m, anodic polarization losses diminish.

Figure 9:
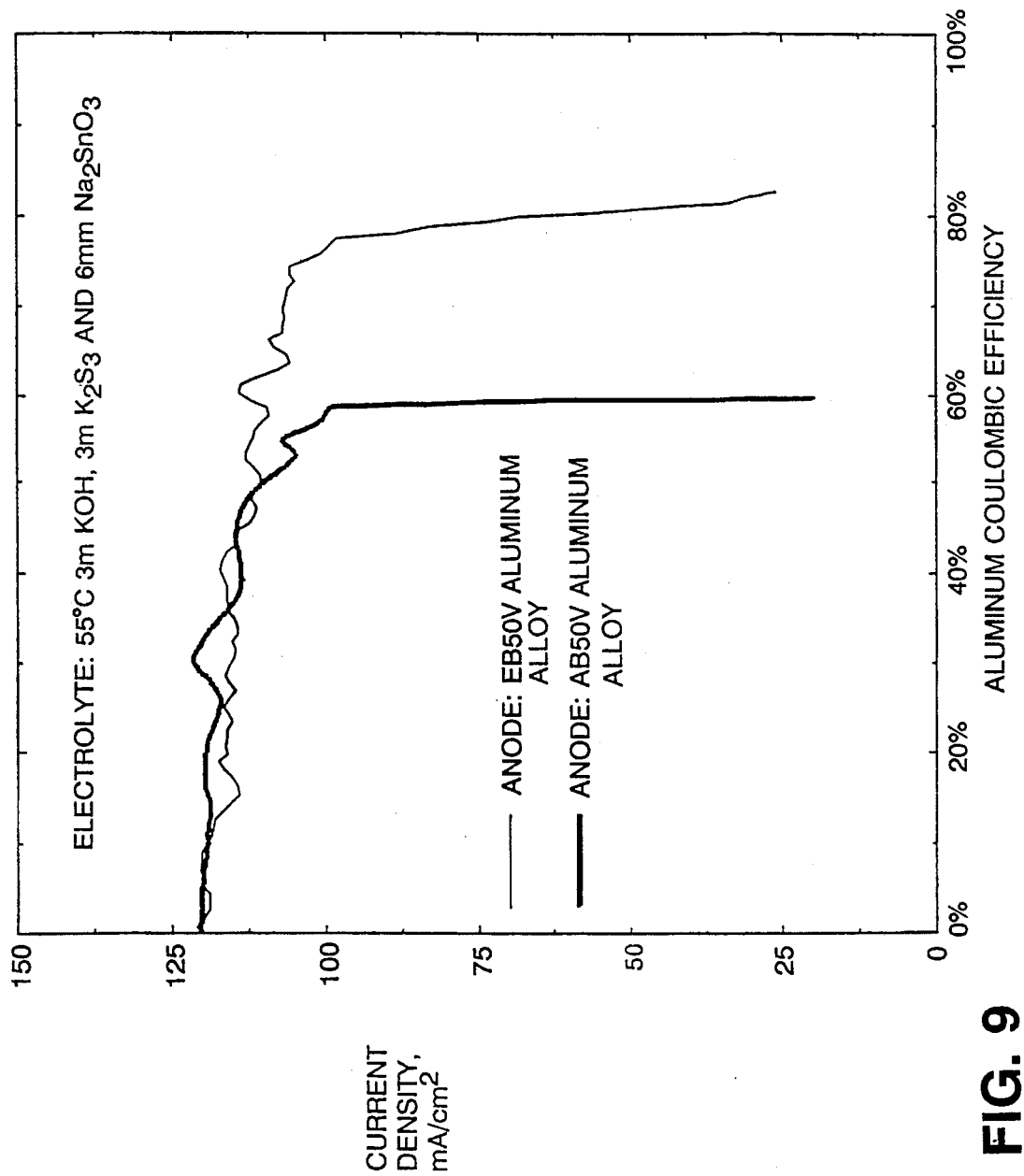
FIG. 9 shows the current density as a function of Coulombic efficiency.

As described herein, small changes in the anode composition are expected to vary the electrochemical behavior of the battery. Referring now to FIG. 9, an anode composed of an aluminum alloy (EB50V) containing 99% aluminum and 1% Mg, Sn, and Ga exhibits improved anodic Coulombic efficiency when compared to a second alloy (AB50V) containing the same metals, but having relatively larger concentrations of Sn and Ga. At a moderate current density (120 mA/cm$^2$) and 55° C., the EB50V alloy displays considerably enhanced Coulombic conversion efficiency. Similarly, when compared to the AB50V alloy at a higher current density and temperature (i.e., 500 mA/cm$^2$ and 75° C.), the EB50V alloy exhibits higher Coulombic efficiency (98% compared to 92%) in the presence of a 6 mm Sn(IV) solution. A similar increase in efficiency (approaching 100% for EB50V, compared to 78% for AB50V) is observed in a 6 mm Ga(III) solution. In a separate experiment, at 75° C., an anode composed of an EB50V aluminum alloy emersed in a 3 m $K_2S_3$/3 m KOH electrolyte solution exhibited an anodic open-circuit potential which is shifted to higher values compared to that for the AB50V alloy.

In other embodiments, the aluminum-containing anode of the electrochemical cell may be placed in direct contact with solutions having high hydroxide ion concentrations (e.g., greater than 10 molar hydroxide). These solutions, in the presence or absence of polysulfide ions, can suppress parasitic chemical reactions at the anode.

Other embodiments are within the scope of the following claims.

What is claimed is:

1. An electrical storage cell, comprising:
   a cathode,
   an aluminum-containing anode, and
   an aqueous, electrolytic solution in direct contact with said aluminum-containing anode, said solution containing sulfide ions, polysulfide ions, or both sulfide ions and polysulfide ions, at a combined sulfide and polysulfide ion concentration of at least 1.0 molal.

2. The electrical storage cell of claim 1, further comprising an electrocatalytic electrode in direct contact with said aqueous electrolytic solution.

3. The electrical storage cell of claim 2, wherein said electrocatalytic electrode comprises a porous material.

4. The electrical storage cell of claim 3, wherein said porous material is porous nickel or porous brass.

5. The electrical storage cell of claim 2, wherein said electrocatalytic electrode comprises cobalt sulfide.

6. The electrical storage cell of claim 2, wherein said electrocatalytic electrode comprises a metal, a metal chalcogenide, or a metal oxide which is insoluble in said aqueous solution.

7. The electrical storage cell of claim 6, wherein said metal is selected from the group consisting of platinum, palladium, nickel, copper, cobalt, manganese, tungsten, steel, molybdenum, iridium, zinc, lead, and alloys thereof.

8. The electrical storage cell of claim 2, wherein said electrocatalytic electrode is a carbon electrode.

9. The electrical storage cell of claim 1, wherein said combined concentration is between 1 and 10 molal, inclusive.

10. The electrical storage cell of claim 1, wherein said combined concentration is between 10 and 20 molal, inclusive.

11. The electrical storage cell of claim 1, wherein said aqueous solution is an alkaline solution.

12. The electrical storage cell of claim 11, wherein said electrolyte solution has a concentration of hydroxide ions of at least a 10 molar.

13. The electrical storage cell of claim 1, wherein said aqueous solution further comprises a cation selected from the group consisting of $Li^+$, $Na^+$, $K^+$, $Rb^+$, $Cs^+$, $NH_4^+$, $Mg^{2+}$, $Ca^{2+}$, $Ba^{2+}$, and $Al^{3+}$.

14. The electrical storage cell of claim 1, wherein said aqueous solution further comprises a halide, nitrate, or sulfate anion.

15. The electrical storage cell of claim 1, wherein said aqueous solution has a conductivity of between 0.001 and 2.0 mho/cm, inclusive.

16. The electrical storage cell of claim 2, wherein said aqueous solution further comprises an additive.

17. The electrical storage cell of claim 16, wherein said additive is selected from the group consisting of indium hydroxide, germanium oxide, sodium stannate, gallium oxide and imidazole salts.

18. The electrical storage cell of claim 1, wherein said aqueous solution is maintained in contact with a solid-phase redox agent.

19. The electrical storage cell of claim 18, wherein said solid-phase redox agent comprises a material selected from the group consisting of solid-phase sulfur, solid polysulfide salts, and hydroxide salts.

20. The electrical storage cell of claim 19, wherein solid sulfur is present at equilibrium in an amount of at least 1% by weight of said aqueous solution.

21. The electrical storage cell of claim 1, wherein said aluminum-containing anode contains 99.9% pure aluminum or an aluminum alloy.

22. The electrical storage cell of claim 1, wherein said aluminum-containing anode includes a pre-treated surface.

23. The electrical storage cell of claim 22, wherein said pre-treated surface comprises amalgamated Hg.

24. An electrical storage cell, comprising:
   an aluminum-containing anode,
   an electrocatalytic electrode, and
   an aqueous, electrolytic solution in direct contact with both said aluminum-containing anode and said electrocatalytic electrode, said solution containing sulfide ions, polysulfide ions, or both sulfide and polysulfide ions, at a combined sulfide and polysulfide ion concentration of at least 1.0 molal.

25. The electrical storage cell of claim 24, wherein said combined concentration is between 1 and 10 molal, inclusive.

26. The electrical storage cell of claim 24, wherein said combined concentration is between 10 and 20 molal, inclusive.

27. The electrical storage cell of claim 24, wherein said aqueous solution is an alkaline solution.

28. The electrical storage cell of claim 27, wherein said electrolyte solution has a concentration of hydroxide ions of at least a 10 molar.

29. The electrical storage cell of claim 24, wherein said aqueous solution further comprises a cation selected from the group consisting of $Li^+$, $Na^+$, $K^+$, $Rb^+$, $Cs^+$, $NH_4^+$, $Mg^{2+}$, $Ca^{2+}$, $Ba^{2+}$, and $Al^{3+}$.

30. The electrical storage cell of claim 24, wherein said aqueous solution further comprises an additive.

31. The electrical storage cell of claim 30, wherein said additive is selected from the group consisting of indium hydroxide, germanium oxide, sodium stannate, gallium oxide and imidazole salts.

32. The electrical storage cell of claim 24, wherein said aqueous solution is maintained in contact with a solid-phase redox agent.

33. The electrical storage cell of claim 32, wherein said solid-phase redox agent comprises a material selected from the group consisting of solid-phase sulfur, solid polysulfide salts, and hydroxide salts.

34. The electrical storage cell of claim 33, wherein solid sulfur is present at equilibrium in an amount of at least 1% by weight of said aqueous solution.

35. The electrical storage cell of claim 24, wherein said aluminum-containing anode contains 99.9% pure aluminum or an aluminum alloy.

36. The electrical storage cell of claim 24, wherein said electrocatalytic electrode comprises a porous material.

37. The electrical storage cell of claim 36, wherein said porous material is porous nickel or porous brass.

38. The electrical storage cell of claim 24, wherein said electrocatalytic electrode comprises cobalt sulfide.

39. The electrical storage cell of claim 24, wherein said electrocatalytic electrode comprises a metal, a metal chalcogenide, or a metal oxide which is insoluble in said aqueous solution.

40. The electrical storage cell of claim 39, wherein said metal is selected from the group consisting of platinum, palladium, nickel, copper, cobalt, manganese, tungsten, steel, molybdenum, iridium, zinc, lead, and alloys thereof.

* * * * *